United States Patent
Braun

[11] 3,816,693
[45] June 11, 1974

[54] ELECTRICAL DISCHARGE MACHINE ADAPTER

[76] Inventor: Ralph A. Braun, 1485 Delynn Dr., Centerville, Ohio 45459

[22] Filed: Nov. 17, 1972

[21] Appl. No.: 307,595

[52] U.S. Cl........ 219/69 E, 219/69 V, 308/DIG. 10
[51] Int. Cl............................................. B23k 9/16
[58] Field of Search.... 219/69 V, 69 C, 69 E, 69 G, 219/69 R; 90/11 AZ, 20.5; 269/254 R; 248/200; 308/DIG. 10

[56] References Cited
UNITED STATES PATENTS

| | | | |
|---|---|---|---|
| 2,385,665 | 9/1945 | Warwick | 219/69 V |
| 2,558,455 | 6/1951 | Novak | 308/DIG. 10 |
| 3,177,337 | 4/1965 | Kohles | 219/69 E |
| 3,443,054 | 5/1969 | O'Connor | 219/69 E |
| 3,454,738 | 7/1969 | Brookshire | 219/69 V |

FOREIGN PATENTS OR APPLICATIONS

| | | | |
|---|---|---|---|
| 341,440 | 9/1920 | Germany | 308/DIG. 10 |
| 381,282 | 10/1964 | Switzerland | 308/DIG. 10 |

*Primary Examiner*—J. V. Truhe
*Assistant Examiner*—Hugh D. Jaeger
*Attorney, Agent, or Firm*—Jerome P. Bloom

[57] ABSTRACT

Apparatus and a system in a machine performing cutting, contouring or like machine operations by an electrical discharge process, featuring use of an electrode mounting adapter attachable to a reciprocable ram, machine head or the like. Electrodes are replaceable without removing the adapter, which is attachable in alternative positions to bring the electrodes to the work either in a sense broadside of endwise thereof. The adapter is a unitary part incorporating in an integrated relation a support body, a rotatable arbor which independently mounts removable electrodes and a turbine means to rotate the arbor. The machining process is carried out in a dielectric fluid bath which provides a source of pressure fluid for energizing of the turbine means.

14 Claims, 4 Drawing Figures

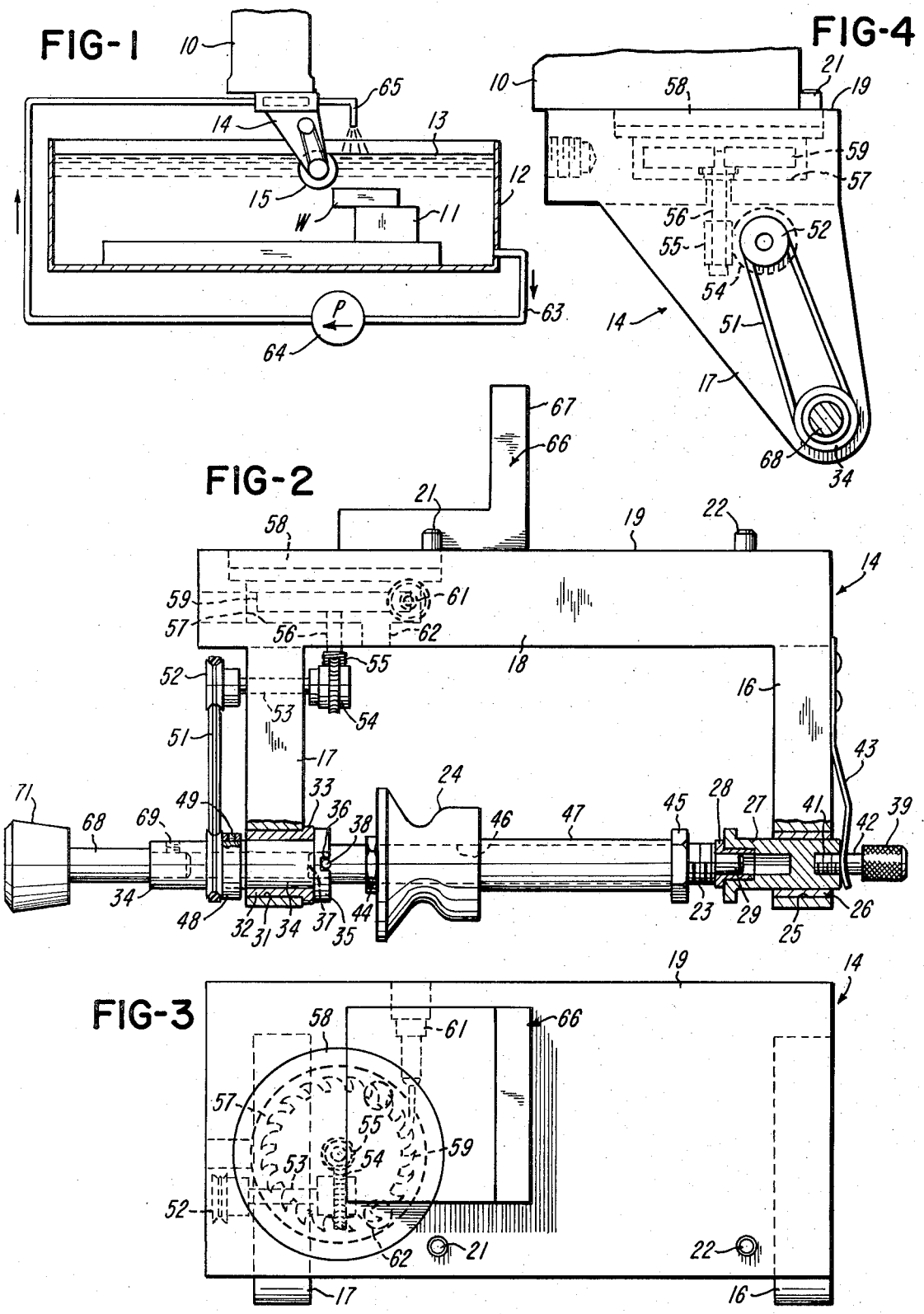

ELECTRICAL DISCHARGE MACHINE ADAPTER

BACKGROUND OF THE INVENTION

The type of machine tool which performs cutting, shaping and like operations on a workpiece by a process of spark or electrical discharge utilizes held electrode means. A holding device mounts the electrode means and conventionally is structured specifically with reference to a particular machine. In the removal of electrode means for reshaping or replacement the entire holding device is removed so that the process is neither quickly nor simply accomplished. Moreover, shaft or arbor means mounting the electrode means is rotated from sources and by means remote from the holding device with attendant complication of structure and difficulty of replacement.

Apparatus in accordance with the present invention accordingly provides an adapter for a standard vertical electrical discharge machine making it possible to utilize a revolving electrode in a manner similar to that in which a circular saw is used, a milling type cutter or a grinding wheel or the like. A standard vertical electric discharge machine uses stationary electrodes and is not constructed to perform work possible with a revolving electrode. Since presently manufactured vertical electric discharge machines employ stationary electrodes only, the device of the present invention increases the utility of existing machines by actually changing their basic design function. The adapter device, through the principle of the revolving electrode, provides a method of utilizing the vertical electric discharge machine in a manner heretofore unknown and may actually permit machining operations on extremely hard materials such as tungsten carbide that have been previously considered impossible. Still further, the revolving electrode produces rapid metal removal from the work piece because of the self-cleaning action which takes place in the dielectric fluid, the motion of the electrode dispersing the eroded particles away from the work piece. The adapter device is designed for quick installation in and removal from a standard or existing electric discharge machine, and for that reason the existing power source of the flush pump may be utilized through a turbine type actuator. There is thus avoided the use of an electric motor, the installation of which would require extensive modification to existing equipment to meet safety requirements. Still further, the holding device does not lend itself to varied attachment so that separate devices must be provided for endwise cutting, as in hole forming operations.

SUMMARY OF THE INVENTION

The instant invention contemplates a generally new concept of use of electroforming electrodes in a spark discharge machine. As a part thereof an electrode means is included in an adapter of substantially universal application to the ram or movable head of any electrical discharge machine. Provision is made for installation of the adapter in alternative position in which the electrode means is brought to the work either in a position broadside thereto or in end relation. An end cutting or side cutting electrode may be used, there being a common drive to each, and the electrode means is quickly and easily replaced in the adapter. Thus, the adapter remains attached to the ram or machine head, while quick connect and disconnect means allows for the independent removal and replacement of the electrodes. An electrode mounting shaft or arbor is rotatably driven in the operation of the machine and according to a further feature of the invention rotary driving means in the form of a pressure fluid energized turbine is integrally incorporated into the adapter. The energizing fluid is drawn from and returned to the bath of dielectric fluid in which the electroforming operation normally takes place.

An object of the invention is to provide a generally new part in an electrical discharge machine in the form of an adapter of wide or substantially universal application integrally incorporating sparking or electrode means.

Another object of the invention is to provide electrode adapter means in which turbine means to rotate an electrode is in a self-contained relation.

A further object of the invention is to provide electrode adapter means alternately positionable to bring electrode means to the work either broadside or endwise thereof.

Still another object of the invention is to enable electrode means to be quickly removed from and replaced in adapter means while it remains mounted to or attached in electrical discharge machining apparatus.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings, wherein is shown one but not necessarily the only form of embodiment of the invention:

FIG. 1 is a system diagram showing electrical discharge apparatus in accordance with the illustrated embodiment of the invention and in particular the mounting of an electrode adapter and the means to rotate electrode means therein;

FIG. 2 is a view in front elevation of the electrode adapter means of FIG. 1;

FIG. 3 is a top plan view, partly broken away, of the adapter means of FIG. 2; and FIG. 4 is an end view of the adapter means.

Referring to the drawings, elements of an electrical discharge machine are not disclosed herein, except for the electrode adapter means with which the invention is concerned and except for a fragmentary showing of a ram or head member 10 which forms a part of the machine and to which the adapter electrode means mounts. In accordance with a known operation of such machines, the ram 10 is advanced toward a workpiece and brings an electrode thereon into a predetermined adjacent relation to the workpiece. With the parts properly included in an electrical circuit arranged for electrical discharge, arcing takes place between electrode means and the workpiece resulting in an electroforming of the workpiece in an erosion or disintegration operation. Thus, as shown in FIG. 1, a workpiece W is suitably supported upon a means 11 in a tank 12 containing a bath 13 of a dielectric fluid. An electrode adapter 14 mounts to the under side of the ram 10 and is projected thereby into the bath 13 where electrode means 15 is caused to rotate in an adjacent relation to the workpiece W and in the presence of an electric discharge, with consequent erosion or machining of the work in conformance with an electrode determining configuration.

The adapter means 14 is, in accordance with the instant invention, a unitary device of substantially universal application to a variety of electric discharge machines and incorporating in itself a means independently to mount electrode elements and means to effect rotation of the electrode elements. As indicated, the adapter means has a yoke shape. Spaced apart arms 16 and 17 are unitarily joined at their one ends by a cross member 18. The latter is relatively broad and thick to serve as a mounting base. An upper surface 19 thereof is adapted flushly to contact the under side of a ram 10 or other reciprocable head means of any of a variety of electrical discharge machines and to be detachably secured thereto. Alignment pins 21 and 22 are set in the surface 19 and when brought to bear against a side of the ram insure an accurate positioning of the adapter means in the machine. So positioned, an installed adapter means can be detachably secured in the machine, as by bolting. At their other or outer ends the arms 16 and 17 relatively rotatably support between them an externally threaded shaft or arbor 23. Electrode means, in the illustrated instance an electrode element 24, is carried by the arbor 23 for unison rotation. In the outer end of arm 16 is an aperture 25 in which is a bushing 26. A sleeve 27 has a slip fit in bushing 26 and projects to either end thereof. At what may be considered its inner end, or that end projecting into the space between arms 16 and 17, the sleeve 27 has a flanged bushing 28 pressed therein. That end of arbor 23 extending toward arm 16 has a reduced diameter tip projecting into bushing 28, a shoulder portion of the arbor seating to the flanged end of the bushing. In the outer end of arm 17 is a through aperture 31 aligning with aperture 25 in arm 16. A bushing 32 is press fit in the aperture 31. One end of bushing 32 projects inwardly of the arm 17 or in the direction of arm 16 and has a flanged extremity 33 seating to the inner surface of the arm 17. A sleeve 34 is rotatable in bushing 32 and at one end projects through and beyond the flanged extremity 33 thereof where it is formed with an enlarged head portion 35 adapted to seat to flanged extremity 33. On what may be regarded as the inwardly facing side of head 35 is a transverse slot 36. That end of arbor 23 which extends toward arm 17 has a reduced diameter portion 37 received in the inner end of sleeve 34, a shoulder on the arbor seating to enlarged head 35. Adjacent to the described shoulder, the arbor has a transverse through opening in which is installed a pin 38 to be received in slot 36. With the slot 36 and pin 38 so engaged, there is, as will be evident, established a driving driven relationship between sleeve 34 and the arbor 23. The relationship is, moreover, a disengageable one in that the arbor may be moved axially to free pin 38 from slot 36 and to withdraw tip 37 from sleeve 34. The arbor is under these conditions released from its mounting between arms 16 and 17 and is readily accessible for the removal and replacement of electrode means thereon. Axial movement of the arbor is, in the illustrated instance, facilitated by a knurled member 39 accessible from outside the arm 16 and having a shank portion 41 installed with a press fit in that end of the sleeve 27 projecting through and beyond bushing 26 to the outside of arm 16. Intermediate its knurled end and shank portion 41, the member 39 has a reduced neck portion 42 embraced by one end of a leaf spring 43.

The opposite end of spring 43 is anchored to arm 16 on the outside thereof. The spring 43 bears against the outer projecting end of sleeve 27 and provides a force to maintain the sleeve 27 in contact with one end of arbor 23 and to apply through the arbor a force tending to maintain the pin 38 in slot 36. By pulling axially outwardly upon member 39, it will draw therewith the sleeve 27 so as to free the arbor 23, which may then be moved axially or to the right as viewed in FIG. 2 to effect the described disengagement of pin 38 from slot 36 and to release arbor 23 for removal from the yoke. The dependent embracing end of the spring 43 is bifurcated and its relation to neck 42 and connected sleeve 27 provides that, upon release of member 39, the sleeve will be biased inwardly of and retained in the yoke in an obvious manner.

The threaded surface of arbor 23 provides, in conjunction with nuts 44 and 45, means to fix thereon the longitudinal position of an electrode element 24. Thus, the electrode element has a through bore 46 through which arbor 23 extends. Through use of the nuts 44 and 45, and an intervening sleeve 47, if required, the electrode element 24 is fixed in a longitudinal position of adjustment and at the same time locked to the arbor 23 for unison rotation. It will be understood that the electrode element 24 may assume varying configurations or may be spaced in any suitable arrangement or number along the arbor 23. Using nuts 44 and 45 and a sleeve or sleeves 47 of appropriate number and length, the selected electrode or assembly of electrodes can be fixed upon the shaft in a desired position of longitudinal adjustment. Upon release of the arbor 23 from its mounting in the yoke body comprised of arms 16 and 17 and cross member 18, the electrode means is readily accessible for removal and for replacement with a like or other arrangement of electrode elements. An arbor with a newly assembled electrode means thereon is reinstalled in the yoke body by inserting tip portion 29 into sleeve 27 and pressing inwardly upon the sleeve, against the urging of spring 43 to align the opposite tip portion 37 with sleeve 34 and to allow for introduction of such tip portion therein in accompaniment with an engagement of pin 38 in slot 36.

Rotation of sleeve 34 which in turn effects a rotary drive of arbor 23 and the electrode means thereon, is accomplished through a pulley wheel 48 made fast by a set screw 49 to the sleeve 34 on an end thereof projecting through and beyond or to the outside of arm 17. Pulley wheel 49 is in the bight of a pulley 51 extending also over a pulley wheel 52 secured to the outwardly extending end of a shaft 53. The latter has a rotatable mounting in the arm 17 and projects inwardly thereof, the inwardly projecting end of the shaft having a worm gear 54 made projecting end of the shaft having a worm gear 54 made fast thereto. The gear 54 meshes with a worm 55 mounted on one end of a shaft 56 disposing at right angles to the shaft 53 and extending into a cavity 57 in the upper or outer surface 19 of cross member 18, which cavity is closed at the surface 19 by a plate 58. Cavity 57 nests a turbine wheel 59 made fast to shaft 56. Rotation of turbine wheel 59, as will be evident, is effective through worm 55 and gear 54 to rotate pulley wheel 52 with this motion being transmitted by pulley 51 to pulley wheel 48. The operation of turbine 59 is by pressure fluid, admitted tangentially of cavity 57 by way of an inlet passage 61, fluid being exhausted from the cavity by way of a drain or exhaust passage 62. As indicated, the turbine wheel 59 orients in cavity 57 in the plane of inlet passageway 61 and presents buckets formed on its periphery to incoming pressure fluid. As may be seen, the wheel 59 and passage 61 are arranged so that the fluid moves tangentially of only a limited outer peripheral portion of the wheel and drives the same in an area of its periphery less than 90° thereof and then escapes. This insures that there will be a maximum usage of the impact energy of the applied fluid. Thus, fluid discharges across the periphery of the turbine, utilizing its energy in imparting a rotational impulse to the turbine and then exhausts through outlet 62. As shown diagrammatically in FIG. 1, energizing pressure fluid for powering the turbine wheel 59 is drawn from the bath 13 of dielectric fluid in which the electrical discharge contouring takes place. A flow line 63 connects at one end to the tank 12 beneath the level of fluid therein. At its other end flow line 53 attaches to the yoke shaped body of adapter means 14 at a location to supply pressure fluid inlet 61. A pump 64 is in line 63 and when energized enforces a pressured flow of fluid from the bath 13 to turbine inlet 61. At least a portion of flow line 63 will include a flexible fluid conducting means whereby the connection will not restrict freedom of relative approaching and retracting movements of the ram 10. Exhaust opening 62 disposes to return spent fluid back to the bath 13. An extension nozzle 65 may be provided for this purpose.

The adapter means 14 has alternative positions of mounting with respect to the ram 10 or other machine head to which it may be attached. In the first described instance, the ram or head mounts directly to the surface 19 of cross member 18 and in this position of the parts arbor 23 disposes horizontally and is brought to the work in a generally broadside relation thereto. In an alternative manner of mounting the yoke-like body of the adapter means is turned approximately 90° from its illustrated position and disposes the arbor 23 in a substantially endwise relation to the work. To facilitate this attachment mode, an angle plate 66, shown in broken lines in FIG. 2, is bolted or otherwise secured to the yoke surface 19. The arrangement is one to present a ram seating surface 67 extending perpendicularly of surface 19 and resulting in arbor 23 being positioned in a parallel offset relation to ram movement.

The rotary drive of the arbor 23 through sleeve 34 enables a use of supplemental or auxiliary electrodes, outside the arm 17, of particular utility in the endwise use of the adapter means. In the illustrated instance, a short length shaft 68 constituting an extension of arbor 23 has a reduced diameter end received in the outer projecting end of sleeve 34 and secured thereto by means of a set screw 69. On the outer end of shaft 68 is fixed an electrode 71. Both shaft 68 and 71 being substantially united with sleeve 34 partake of the rotation imparted thereto and rotate simultaneously with arbor 23. While the electrode 71 may have a function complementary to that of electrode or electrode elements 24 it may also, as in the illustrated instance, have an alternative function. Thus, with the adapter means attached in its alternative position, using angle plate 66, the electrode 71 disposes downwardly of and coaxially of the arbor 23 and may be specifically and singly operative upon the work, as for the purpose of hole drilling.

The adapter means of the invention incorporates in itself all of the means required for electrode mounting, replacement and rotation. The adapter means is thus a complete unit which can be selectively installed as desired upon any electrical discharge machine with a minimal requirement for outside connections. It may be noted in this rgard that a pump is a usual and conventional part of electrical discharge machine systems, being used to circulate the dielectric fluid for flushing purposes. The quick connect and disconnect mechanism associated with the arbor 23 obviates problems of assembly and disassembly and does not require that the adapter means be removed from the machine in order that electrode elements can be removed for reshaping or replacement. The alternative mounting of the adapter means makes the apparatus more flexible with respect to encountered workpieces and enables the same unit to be used for differential classes of work, as for example a milling of slots and boring of holes.

The turbine wheel 59 is particularly well adapted to sensitive, efficient response to inflowing pressure fluid. It can, however, be replaced with a conventional rotary vane motor, should it be found to be required and distinctive and important features of the invention will still remain. If it is found desirable to regulate the speed or rotation of arbor 27, suitable throttle valve means can be incorporated in flow line 63, beyond pump 64, or directly in pressure inlet 61, to control the rate of flow to the turbine wheel.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and the construction herein disclosed comprise but one of several modes of putting the invention into effect and the invention is therefore claimed in any of its forms or modifications within the legitimate and valid scope of the appended claims.

Having thus described my invention, I claim:

1. For use in an electrical discharge machine providing a ram-like device to be advanced and retracted relative to a work piece, an adapter including electrode mounting means attachable to said ram-like device having interrelated means for releasably supporting electrodes thereon, said last named means being arranged to provide for replacing or adding electrodes in said adapter without removing said adapter from the machine, said adapter including an adapter body providing means for attachment thereof to said ram-like device and said interrelated means including a rotatable arbor in releasable connection with said body and said arbor being arranged for the selective mounting thereon of one or more electrodes rotatable with said arbor.

2. An adapter according to claim 1, characterized by said adapter body having the form of a yoke including projected arms and a cross member interconnecting said arms, said cross member providing means defining a place of attachment of the adapter body to said ram-like device, the arms of said yoke providing for a releasable installation of said arbor in connection therewith.

3. An adapter according to claim 2 characterized by said arbor incorporating means to variably position electrodes thereon, in differing configuration or number.

4. An adapter as set forth in claim 1 characterized by said arbor having in connection therewith means for mounting electrodes thereto in a plurality of positions, including positions selectively within and exteriorly of the boundary of said adapter.

5. An adapter according to claim 2 characterized by said arms of said yoke providing means to selectively connect therewith one or more arbors arranged to mount electrodes in a selective orientation in respect thereto.

6. An adapter in accordance with claim 1 characterized by said interrelated means further including a drivable element rotatably mounted in said adapter body providing means for engagement therewith of one end of said electrode mounting arbor and said adapter body having integrated thereto means in driving connection with said drivable element to rotate said arbor and the electrode or electrodes mounted thereby.

7. An adapter according to claim 2 characterized by said interrelated means further including a drivable element embodied in one of said arms arranged to receive one end of an electrode mounting arbor and the other of said arms having in connection therewith means for releasably mounting in bearing relation thereto the opposite end of an electrode mounting arbor whereby to support the same for relative rotation on said yoke.

8. An adaptor according to claim 7 characterized by said means which supports an opposite end of an electrode mounting arbor being axially displaceable for release of said opposite end of said electrode mounting arbor and having in connection therewith means for biasing thereof to maintain a connection with said opposite end of the electrode mounting arbor.

9. An adapter according to claim 1 characterized by said adapter body having means for the selective mount thereof in a plurality of angularly related positions referenced to said ram-like device whereby to present electrodes mounted thereon in a plurality of positions referenced to a work piece.

10. An adapter as in claim 9 characterized by said adapter body providing by virtue of said interrelated means a means for selectively positioning electrodes broadside thereto or displaced outwardly thereof whereby to selectivey enable contouring or hole forming operations in use of said electrodes.

11. An adapter according to claim 2, wherein said arbor is mounted between said arms to dispose substantially parallel to said cross member, said electrodes being mounted on said arbor concentrically thereof to revolve in planes substantially perpendicular to said cross member.

12. An adapter according to claim 2, wherein means mounted to one arm of said yoke support one end of said arbor for relative axial and rotary movements and include in connection therewith means urging said arbor in an axial sense toward the other arm of the yoke, the other end of said arbor bearing in said other arm of said yoke and being releasable therefrom by a relative axial motion of said arbor in a direction toward the said one arm of said yoke.

13. An adapter according to claim 12, wherein said means mounted to said one arm of said yoke include a sleeve axially displaceable in said one arm and having an inner end relatively rotatably receiving said one end of said arbor, said means urging said arbor in an axial sense including a yoke mounted means biasing said sleeve to maintain an interengagement thereof with said arbor.

14. An adapter according to claim 13 characterized by a rotary driven sleeve mounted in the said other arm of said yoke, the said other end of said arbor having a releasable driven connection with said driven sleeve and being urged by said biasing means to effect said driven connection, axial movement of said arbor against the urging of said biasing means disabling said driven connection.

* * * * *

UNITED STATES PATENT OFFICE
CERTIFICATE OF CORRECTION

Patent No. 3,816,693  Dated June 11, 1974

Inventor(s) Ralph A. Braun

It is certified that error appears in the above-identified patent and that said Letters Patent are hereby corrected as shown below:

In the Abstract, line 8 thereof, "of" is corrected to read -- or --.

Column 4, lines 55-56, "projecting end of the shaft having a worm gear 54 made" is deleted.

Column 6, line 7, "rgard" is corrected to read -- regard --.

Column 6, line 25, "or" is corrected to read -- of --.

Column 8, Claim 10, line 5 thereof, "selectivey" is corrected to read -- selectively --.

Signed and sealed this 12th day of November 1974.

(SEAL)
Attest:

McCOY M. GIBSON JR.
Attesting Officer

C. MARSHALL DANN
Commissioner of Patents